United States Patent Office

2,904,580
Patented Sept. 15, 1959

2,904,580

PROCESS FOR THE MANUFACTURE OF ACRYLONITRILE

James D. Idol, Jr., Shaker Heights, Ohio, assignor to The Standard Oil Company, Cleveland, Ohio, a corporation of Ohio No Drawing. Application September 20, 1957
Serial No. 685,352

6 Claims. (Cl. 260—465.3)

This invention relates to the manufacture of acrylonitrile. It is particularly concerned with the production of acrylonitrile from propylene.

Several methods of producing aliphatic nitriles are known to the art. For example, one known process involves the dehydration of the corresponding amide. According to another scheme, an α,β-unsaturated aliphatic aldehyde is reacted with ammonia and molecular oxygen in the presence of a catalyst to form the corresponding unsaturated nitrile. Still another process for the production of unsaturated nitriles involves the vapor phase reaction of acetylene and hydrogen cyanide in the presence of a catalyst.

U.S. Patent No. 2,481,826 to Cosby also describes a process for the manufacture of the lower aliphatic nitriles. According to this patent, an olefin is reacted with at least one mol of ammonia per mol of olefin in the presence of elemental oxygen to give aliphatic nitriles. The patentee states that an oxidation catalyst will improve the results of his process, but the presence of a catalyst apparently is not considered necessary to the process. The process of the present invention is to be distinguished from all of the aforesaid known processes.

In its broadest aspect the process comprises contacting a mixture comprising propylene, ammonia and oxygen with a catalyst at an elevated temperature and at atmospheric or near atmospheric pressure.

THE REACTANTS

The reactants are propylene, ammonia, and oxygen. Any source of oxygen may be employed in this process. For economic reasons, however, it is preferred that air be employed as the source of oxygen. From a purely technical viewpoint, relatively pure molecular oxygen will give equivalent results. The molar ratio of oxygen to the olefin in the feed to the reaction vessel should be in the range of 0.5:1 to 3:1 and a ratio of about 1:1 to 2:1 is preferred.

The presence of the corresponding saturated hydrocarbons does not appear to influence to any appreciable degree the reaction, and these materials appear to act only as diluents. Consequently, the presence of the corresponding saturated hydrocarbons or other saturated hydrocarbons in the feed to the reaction is contemplated within the scope of this invention. Likewise, other diluents such as nitrogen and the oxides of carbon may be present in the reaction mixture without deleterious effect.

AMMONIA-PROPYLENE RATIO

The molar ratio of ammonia to propylene in the feed to the reaction may vary between about 0.05:1 to 5:1. There is no real upper limit for the ammonia-propylene ratio, but there is generally no point in exceeding the 5:1 ratio. At ammonia-propylene ratios appreciably less than the stoichiometric ratio of 1:1, various amounts of oxygenated derivatives of propylene will be formed.

Significant amounts of acrolein as well as acrylonitrile will be obtained at ammonia-propylene ratios substantially below 1:1, i.e., in the range of 0.15:1 to 0.75:1. Outside the upper limit of this range only insignificant amounts of acrolein will be produced, and only very small amounts of acrylonitrile will be produced at ammonia-propylene ratios below the lower limit of this range. It is fortuitous that within the ammonia-propylene range stated, maximum utilization of ammonia is obtained and this is highly desirable. At present price levels ammonia is more expensive than the propylene, and it is generally possible to recycle the propylene to the process, whereas the unconverted ammonia may be recovered and recycled only with difficulty.

$H_2O$-PROPYLENE RATIO

A particularly surprising aspect of this invention is the effect of water on the course of the reaction. I have found that the presence of water in the mixture fed to the reaction vessel improves the selectivity and yield of the reaction so far as the production of the acrylonitrile is concerned. Improvements on the order of several hundred percent have been observed in the presence of water as compared to similar runs made in the absence of added water. Consequently, the presence of water has a marked beneficial effect on this reaction, but reactions not including water in the feed are not to be excluded from this invention.

In general, the molar ratio of water to propylene should be at least about 0.25:1. Ratios on the order of 1:1 are particularly desirable but higher ratios may be employed, i.e., up to about 10:1. Because of the recovery problems involved, it is generally preferred to use only so much water as is necessary to obtain the desired improvement in yield. It is to be understood that water does not behave as a diluent in the reaction mixture. This conclusion has been verified by employing other diluents in the reaction mixture, such as propane and nitrogen. No corresponding improvement in yield and selectivity is observed with such diluents. Although the exact manner in which the water affects the reaction is not understood, it is clear that the water does have a significant influence on the reaction.

One theory which has been postulated to explain the effect of water on the reaction involves the phenomena occurring at the surface of the catalyst. Water, because of its polarity, may assist in the desorption of the reaction products from the surface of the catalyst. According to another hypothesis, the water may change the nature of the catalyst at the catalyst surface by affecting the acidity of the catalyst. Notwithstanding the fact that either of these theories may be in error, the improved results occasioned by the use of water are evident and the theory by which these results are to be explained is therefore to be considered immaterial.

THE CATALYST

A particularly desirable group of catalysts for the purposes of this invention are the bismuth, tin, and antimony salts of phosphomolybdic and molybdic acids, and of these a bismuth phosphomolybdate is preferred and gives the most outstanding results. A preferred method of preparing a bismuth phosphomolybdate will be described hereinafter in connection with the working examples of the invention.

It is, of course, contemplated that the aforementioned catalysts can be used alone or supported on carrier materials. Any suitable carrier material may be used, such as, for example, silica. Silica is particularly suitable as a support for the catalysts of this invention and it is preferred. In general, the support will be employed in amounts less than 90% by weight of the final catalyst composition.

The catalyst may be prepared by any of the numerous methods of catalyst preparation which are known to those skilled in the art. For example, the catalyst may be manufactured by co-gelling the various ingredients. The co-gelled mass may then be dried and ground to an appropriate size. Alternately, the co-gelled material may be slurried and spray dried in accordance with conventional techniques. The catalyst may be extruded as pellets or formed into spheres in oil as is well known in the art. Alternatively, the catalyst components may be mixed with the support in the form of the slurry followed by drying, or may be impregnated on silica or other support.

The surface area of the catalyst is of some importance as I have found that high surface area catalysts tend to favor the further oxidation of the olefin to undesirable products. In general, the surface area of the catalyst should not exceed 750 sq. meters/gram, but it does not appear that there is any lower limit on surface area. In some instances it may be desirable to heat treat the catalyst after preparation for the purpose of modifying the surface area and/or for the purpose of driving off those volatile ingredients which are included in the catalyst during the separation but which are necessary to its operability. The catalyst may be prepared in any convenient form as, for example, pellets or small particles suitable for use in a so-called "fluidized" reactor bed.

PROCESS CONDITIONS

The temperature at which the reaction is carried out may be any temperature in the range of 550 to 1000° F. The preferred temperature range runs from about 800 to 950° F.

The pressure at which the reaction is conducted is also an important variable, and the reaction should be carried out at about atmospheric or slightly above atmospheric (2 to 3 atmospheres) pressure. In general, high pressures, i.e., above 250 p.s.i.g., are not suitable for the process since higher pressures tend to favor the formation of undesirable by-products.

The apparent contact time employed in the process is not especially critical, and contact times in the range of 0.1 to 50 seconds may be employed. The apparent contact time may be defined as the length of time in seconds which a unit volume of gas measured under the conditions of reaction is in contact with the apparent unit volume of the catalyst. It may be calculated, for example, from the apparent volume of the catalyst bed, the average temperature of the reactor, and the flow rates in the vessel of the components of the reaction mixture. The optimum contact time will, of course, vary depending upon the olefin being treated, but in general it may be said that a contact time of 1 to 15 seconds is preferred.

In general, any apparatus of the type suitable for carrying out oxidation reaction in the vapor phase may be employed in the execution of this process. The process may be conducted either continuously or intermittently. The catalyst bed may be a fixed bed employing a pelleted catalyst or, in the alternative, a so-called "fluidized" bed of catalyst may be employed. The fluidized bed offers definite advantages with regard to process control in that such a bed permits closer control of the temperature of the reaction as is well known to those skilled in the art.

The reactor may be brought to the reaction temperature before or after the introduction of the reaction feed mixture. However, on a large scale operation it is preferred to carry out the process in a continuous manner, and in such a system the recirculation of the unreacted olefin is contemplated. Periodic regeneration or reactivation of the catalyst is also contemplated, and this may be accomplished, for example, by contacting the catalyst with air at an elevated temperature.

The products of the reaction may be recovered by any of the methods known to those skilled in the art. One such method involves scrubbing the effluent gases from the reactor with cold water or an appropriate solvent to remove the products of the reaction. In such a case, the ultimate recovery of the products may be accomplished by conventional means. The efficiency of the scrubbing operation may be improved when water is employed as the scrubbing agent by adding a suitable wetting agent to the water. Where molecular oxygen is employed as the oxidizing agent in this process, the resulting product mixture remaining after the removal of the nitriles may be treated to remove carbon dioxide with the remainder of the mixture containing the unreacted propylene and oxygen being recycled through the reactor. In the case where air is employed as the oxidizing agent in lieu of molecular oxygen, the residual product after separation of the nitriles and other carbonyl products may be scrubbed with a non-polar solvent, e.g., a hydrocarbon fraction in order to recover unreacted propylene and in this case the remaining gases may be discarded. The addition of a suitable inhibitor to prevent polymerization of the unsaturated products during the recovery steps is also contemplated.

Having thus provided a general description of the process of this invention, a description of the best mode of practicing my invention is first given, followed by other procedures both within the invention and also without, for comparative purposes.

In all of the examples conventional reaction vessels and auxiliary equipment, including meters, were employed for carrying out the reactions, and all of the data reported herein is within the usual limits of experimental accuracy for such equipment. The products of the reaction were recovered by scrubbing the effluent gases from the reactor with water. The products were analyzed by conventional means, including mass spectrographic, gas chromatographic, and infra red spectrometric analyses as well as conventional titration where such analyses were applicable.

In the examples the following definitions are employed:

Percent conversion
$$= \frac{\text{Weight of carbon in the product}}{\text{Weight of carbon in the propylene fed}} \times 100$$

Percent yield
$$= \frac{\text{Weight of carbon in the product}}{\text{Total weight of carbon in the converted propylene}} \times 100$$

The above definitions are on a carbon basis. In some instances it was desired to calculate the conversion and yield on a nitrogen basis. This was done according to the following definition:

Percent conversion
$$= \frac{\text{Weight of nitrogen in the product}}{\text{Weight of nitrogen in the NH}_3 \text{ in the feed}} \times 100$$

Percent yield
$$= \frac{\text{Weight of nitrogen in the product}}{\text{Weight of nitrogen in the ammonia converted}} \times 100$$

*Example 1*

A bismuth phosphomolybdate catalyst was prepared in the following manner:

A solution containing 9.3 cc. of 85% phosphoric acid, 272 g. of molybdic acid (85% $MoO_3$), 40 cc. of nitric acid, and 582 g. of $Bi(NO_3)_3 \cdot 5H_2O$ in 400 cc. of water was added to 750 g. of an aqueous solution of an aqueous colloidal silica sol containing 30% silica. The mixture was then evaporated to dryness and heated at 1000° F. for 16 hours. Subsequently, it was ground and screened to 40–100 mesh.

325 g. of this catalyst was placed in a conventional oxidation reactor. According to the best mode I contemplate of carrying out this invention, the reactor was maintained at a temperature of 850° F. and at approximately atmospheric pressure. A mixture of propylene, ammonia, water, and air was introduced into the reactor, and contact times of 7.8 seconds were employed.

The feed had the following composition:

| | Mol percent |
|---|---|
| Propylene | 10 |
| Air | 75 |
| Water | 10 |
| Ammonia | 5 |

The conversions on the carbon basis were as follows:

| | Percent |
|---|---|
| Acrylonitrile | 33.2 |
| Acetonitrile | 3.2 |
| Acrolein | 2.7 |

The yield of useful products on a nitrogen basis was 81%.

Examples 2–8

Another series of runs were made employing the catalyst of Example 1 in which the ammonia-propylene ratios were varied in order to study the effect of this variable on the conversions to acrylonitrile on a carbon and nitrogen basis, and also to study the ratio of acrylonitrile and acrolein in the products. The reaction conditions were identical to those employed in the preceding example. The air to propylene ratio was 7.5:1 and the water to propylene ratio was 1:1. The results are reported in Table I.

TABLE I

| Example No. | Ammonia to Propylene Ratio | Percent Conversion on C-Basis | | Percent Conversion on N-Basis— Acrylonitrile |
|---|---|---|---|---|
| | | Acrylonitrile | Acrolein | |
| 2 | 0.1 | 2.9 | 13.5 | 27.0 |
| 3 | 0.15 | 7.0 | 10.1 | 45.5 |
| 4 | 0.25 | 16.9 | 8.2 | 65.5 |
| 5 | 0.35 | 23.0 | 3.9 | 64.4 |
| 6 [1] | 0.5 | 33.2 | 2.7 | 65.3 |
| 7 | 1.0 | 50.2 | 0.0 | 47.7 |
| 8 | 2.0 | 52.8 | 0.0 | 25.3 |

[1] Same as Example 1.

These data show that this process permits substantial variation in the nature and amounts of the desired products.

Examples 9–17

In another set of runs, the effect of water on the reaction was shown. In these runs the catalyst of Example 1 was employed, and the conditions were identical to those of the preceding examples. The air to propylene ratio was 7.5:1 and the amount of water and ammonia in the feed was varied. The results appear in Table II.

TABLE II

| Example No. | Water to Propylene Ratio | Ammonia to Propylene Ratio | Percent Conversion on C-Basis— Acrylonitrile | Percent Conversion on N-Basis— Acrylonitrile |
|---|---|---|---|---|
| 9 | 0 | 2 | 34.5 | 17.0 |
| 10 | 1 | 2 | 52.8 | 22.3 |
| 11 | 0 | 1 | 46.3 | 45.1 |
| 12 | 1 | 1 | 50.2 | 47.7 |
| 13 | 0 | 0.5 | 17.1 | 32.9 |
| 14 | 1 | 0.5 | 33.2 | 61.5 |
| 15 | 0 | 0.15 | 7.6 | 24.5 |
| 16 | 1 | 0.15 | 7.0 | 45.5 |
| 17 [1] | 3 | 1 | 45.9 | 48.3 |

[1] The air to propylene ratio in this example was 10:1.

Example 18

A tin phosphomolybdate catalyst was prepared in the following manner:

95 g. of stannous chloride dihydrate was dissolved in 200 cc. water, and the pH of this solution was adjusted to 7 with concentrated ammonium hydroxide. The resulting precipitate was filtered and washed. In another vessel, 5.8 cc. of 85 percent phosphoric acid was added to 1330 g. of a low alkali aqueous sol of colloidal silica containing 30 weight percent silica. Next, a solution of 170 g. of molybdic acid in 150 cc. of water was added to the silica solution. The washed precipitate was slurried in 100 cc. of water and added to the silica mixture. The resulting gel was partially dried and the drying was completed by heating the gel in air at 1000° F. for a period of 2 hours. The dried catalyst was ground and screened to 40–100 mesh.

325 g. of the tin phosphomolybdate catalyst was placed in a conventional oxidation reactor. The reactor was maintained at a temperature of 850° F. and at approximately atmospheric pressure during the course of this run. The contact time during this run was 7.5 seconds. The feed composition was as follows.

| Component: | Mol percent |
|---|---|
| Propylene | 9 |
| Propane | 27 |
| Air | 45 |
| Ammonia | 9 |
| Water | 9 |

The products of this reaction and the conversions on a carbon basis were as follows.

| Product: | Percent conversion |
|---|---|
| Acrylonitrile | 6.9 |
| Acetonitrile | 4.3 |
| Acrolein | 0.3 |

The yield of useful products on a carbon basis was 46.5%.

Example 19

A bismuth phosphotungstate catalyst was prepared in the following manner:

325 g. of $Bi(NO_3)_3 \cdot 5H_2O$ was dissolved in 200 ml. of water which had been acidified with 25 ml. of $HNO_3$. The bismuth nitrate was brought into solution with heating and stirring. 507 g. of $H_3PW_{12}O_{40} \cdot 26H_2O$ was dissolved in water and mixed with 2500 grams of a 30% aqueous solution of colloidal silica. To this mixture was added the bismuth nitrate solution, and the resulting preparation was partially evaporated and gelled with heating on a hot plate until the resulting gel had the consistency of a thick mud. It was then removed from the hot plate and placed in a muffle furnace for two hours at 800° F. The dried gel was then ground and screened, that portion being reserved for use which passed a 30-mesh screen but was retained on a 100-mesh screen.

325 g. of the bismuth phosphotungstate catalyst was inserted in a conventional oxidation reactor. The reaction conditions during this run were identical to those listed in Example 17 above. The feed to the reaction had the following composition.

| Component: | Mol percent |
|---|---|
| Propylene | 9 |
| Propane | 9 |
| Air | 45 |
| Water | 27 |
| Ammonia | 9 |

The products and the conversions on a carbon basis were as follows.

| Product: | Percent conversion |
|---|---|
| Acrylonitrile | 7.9 |
| Acetonitrile | 1.4 |

The yield of useful products on a carbon basis was 36.7%.

It will be obvious to persons skilled in the art that various modifications of this process as described in the preceding examples may be made. However, this application for Letters Patent is intended to cover all such modifications which reasonably fall within the scope of the appended claims.

I claim:

1. A process for the manufacture of acrylonitrile comprising the step of contacting in the vapor phase a mixture of propylene, ammonia and oxygen with a catalyst selected from the group consisting of the bismuth, tin, and antimony salts of phosphomolybdic and molybdic acids and bismuth phosphotungstate.

2. The process of claim 1 in which the molar ratio of oxygen to propylene is in the range of about 1:1 to about 2:1.

3. The process of claim 1 in which the ratio of ammonia to propylene is about 1:1.

4. The process of claim 1 in which the catalyst is bismuth phosphomolybdate.

5. The process of claim 1 in which the catalyst is bismuth phosphomolybdate supported on silica.

6. A process for the manufacture of acrylonitrile which comprises the step of contacting in the vapor phase at a temperature of about 850° F. a mixture of propylene, ammonia, and oxygen with a fluidized bed of catalyst consisting essentially of bismuth phosphomolybdate supported on silica, said mixture having a molar ratio of propylene to ammonia of about 1:1 and a molar ratio of propylene to oxygen of about 1:2.

References Cited in the file of this patent

UNITED STATES PATENTS

| | | |
|---|---|---|
| 2,417,893 | Teter | Mar. 25, 1947 |
| 2,481,826 | Cosby | Sept. 13, 1949 |